Aug. 31, 1926. 1,597,957
W. G. DUFFIELD
PLOW
Original Filed Dec. 22, 1919 4 Sheets-Sheet 2

Witness
E. Wilderson

Inventor
Wayne G. Duffield
by W. C. Jinlinton
Attorney

Aug. 31, 1926.
W. G. DUFFIELD
1,597,957
PLOW
Original Filed Dec. 22, 1919 4 Sheets-Sheet 3
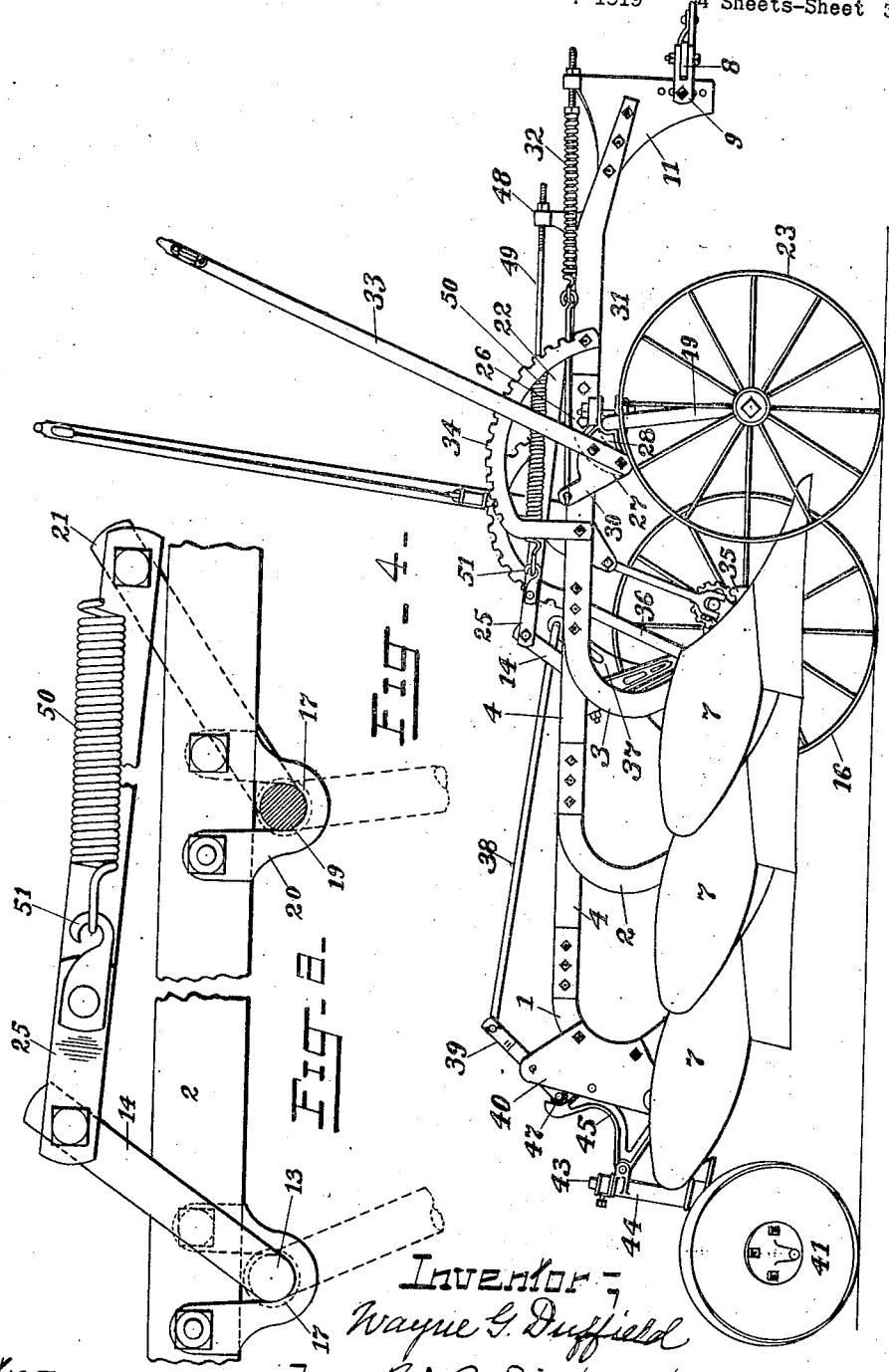
Inventor –
Wayne G. Duffield
by W.C. Johnston
Attorney
Witness:
E. Wilchison

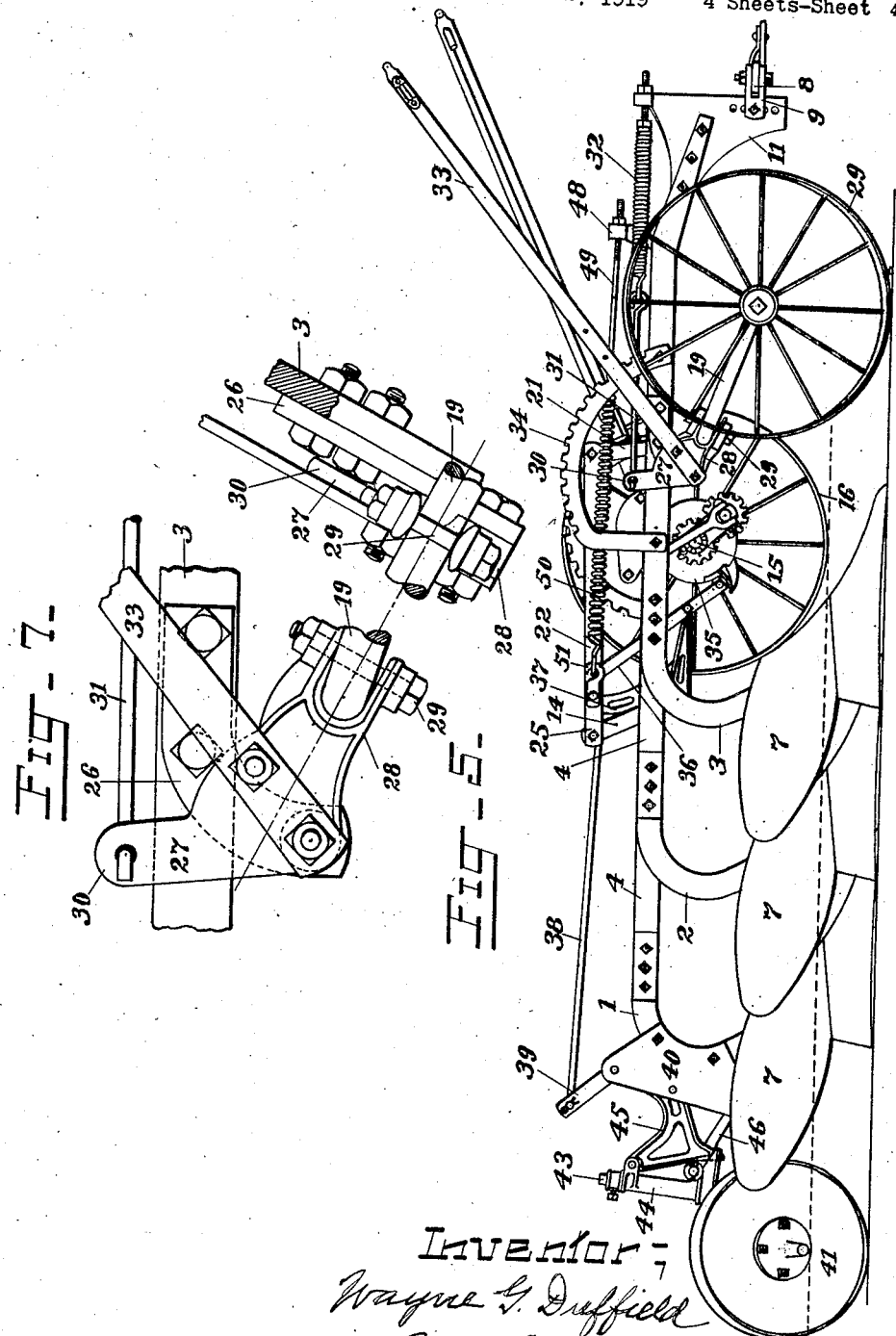

Patented Aug. 31, 1926.

1,597,957

UNITED STATES PATENT OFFICE.

WAYNE G. DUFFIELD, OF MOLINE, ILLINOIS, ASSIGNOR TO DEERE & COMPANY, OF MOLINE, ILLINOIS, A CORPORATION OF ILLINOIS.

PLOW.

Application filed December 22, 1919, Serial No. 346,706. Renewed March 21, 1922.

My invention relates to gang plows, preferably of the power lift class, in which the landward wheel and the forward furrow wheel are supported on independent axles connected together to be operated in unison in raising and lowering the plow. The object of my invention is to provide means by the operation of which the plow can be maintained at all times, in a parallel relation with the ground. Other objects will be fully described in the following specification.

Referring to the drawings in which similar numerals indicate identical parts:—

Figure 4 is a side elevation with the plow raised.

Figure 5 is a side elevation with the plow in operative position.

Figure 6 is an enlarged detail of the connection between the two axles.

Figure 7 is an enlarged detail of the means employed in adjusting the furrow wheel to level the plow, and Figure 8 is an enlarged detail of the bearings of the landwheel axle and the landward end of the furrow wheel axle.

Figure 1:
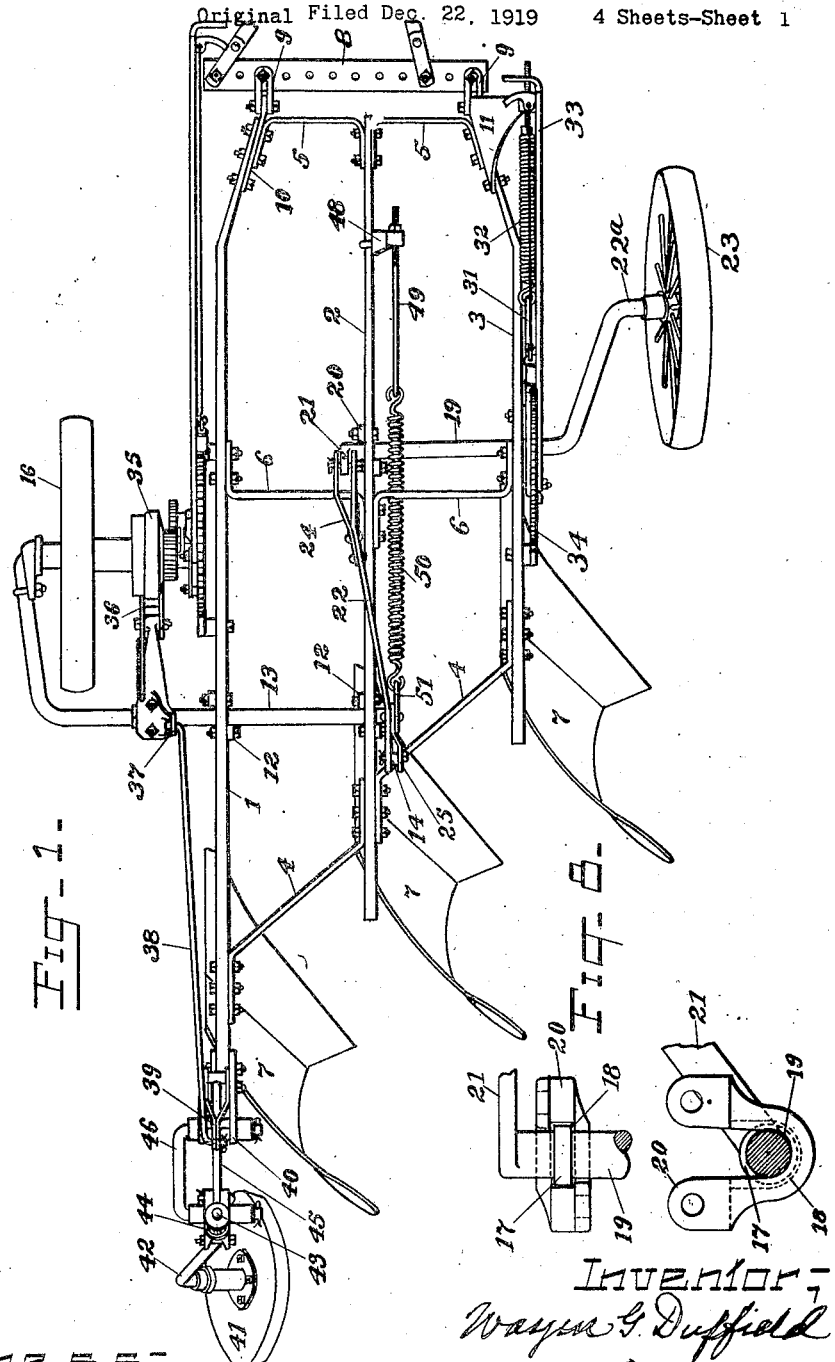
Figure 1 is a plan view of a gang plow embodying my improvements.
Figure 2:
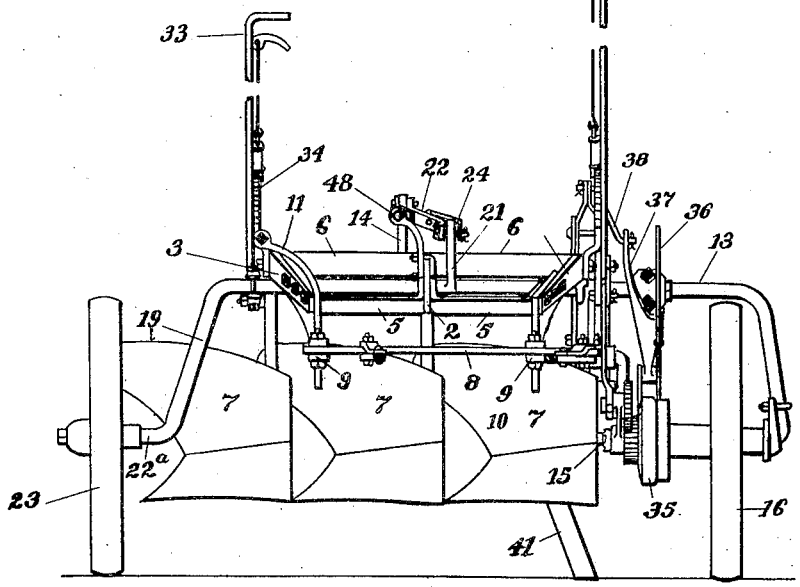
Figure 2 is a front elevation with the plow raised.
Figure 3:
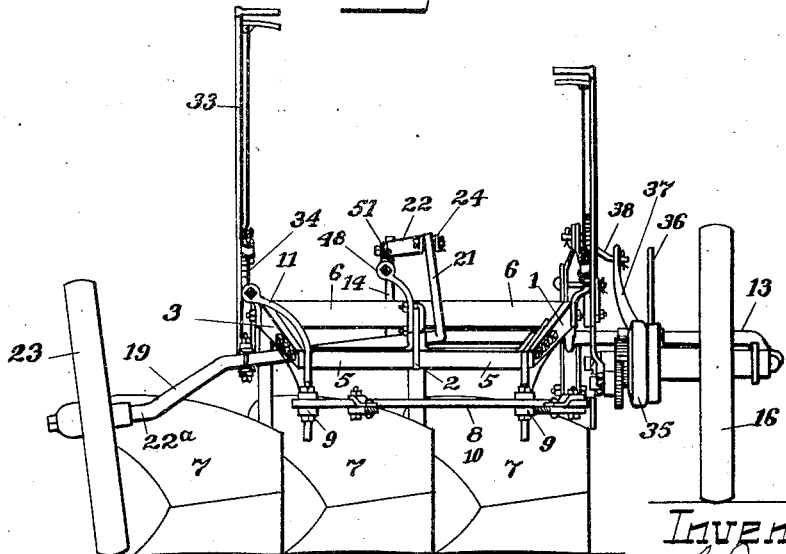
Figure 3 is a similar view to Figure 2 with the plow in operative position.

While my improvement may be applied to wheeled plows having one or more plow bodies, I have illustrated my improvements embodied in a plow of three plowing units, consisting of beams 1, 2 and 3 spaced apart and rigidly connected together by rear braces 4, forward braces 5 and intermediate braces 6. On the rear of each of the beams is mounted a plow 7 of a type well known in the art. The beams 1 and 3 converge toward the central beam 2 and are connected with a laterally extending draw bar 8 by links 9 which are pivotally supported on plates 10 and 11, the plate 10 being rigidly held between the beam 1 and the adjacent brace 5 by suitable bolts, and the plate 11 similarly secured between the beam 3 and its adjacent brace 5. To the draw bar 8 any desired draft device can be attached.

Rockably journaled in bearings 12 on the beams 1 and 2 is an axle 13 having its inner and bent upwardly and flattened to form an arm 14. Landwardly the axle 13 extends downwardly, and preferably forwardly, and terminates in a horizontal spindle 15 extended toward the beam 1, and having mounted thereon a landwheel 16. The bearings 12 are provided with a central groove 18 in which collars 17, rigidly secured on the axle 13, are loosely held to prevent lateral movement of the axle 13, and a furrow wheel axle 19, parallel with and forward of the axle 13, has its inner end loosely journaled in a bearing 20, secured on the beam 2, and bent upwardly and flattened to form an arm 21 which is connected with the arm 14 by a link 22, whereby both axles are rockable in unison. Furrowward the axle 19 is bent downward and terminates in a spindle 22ª on which is mounted a furrow wheel 23. A strap 24 is rigidly secured to the link 22 and extends to the arm 21 to which it is connected on the side opposite to the link 22. A similar strap 25 is secured in a similar way to the rear end of the link 22 and the arm 14. An upwardly extending bracket 48 is mounted forwardly on the bear 2, and a rod 49 is connected to the bracket 48 and to a coiled spring 50 which is attached to a hook 51 on the link 22, so that the tension of the spring assists in raising the plow.

A downwardly extending bracket 26 is rigidly secured to the beam 3 and on its lower end I pivotally mount a bell crank 27 having its forwardly extending arm 28 bifurcated for the reception of the axle 19 which is rotatably held therein by a bolt 29. To the opposite arm 30 of the bellcrank 27 is connected a rod 31 having its opposite end connected to a coiled spring 32 the forward end of which is secured to the plate 11. A lever 33 is mounted on the bellcrank 27 and is provided with the usual type of latch and dog to engage with notches in a sector 34 on the beam 3.

The power lift mechanism may be any one of several types known in the art, but I prefer that having a two part clutch 35 on the spindle 15 which is operated by actuation of a tripping lever 36. A lever 37 is rigidly secured intermediate its ends, on the axle 13, the tripping lever 36 being pivotally carried on its lower end; to the upper end of the lever 37 is connected a rod 38 extending to a lever 39, pivotally mounted intermediate its ends on a bracket 40 on the rear of the beam 1. A rear furrow wheel 41 is mounted on a crank axle 42 having an upstanding spindle 43, the latter being rotatably journaled in a sleeve 44 which is movably connected to the bracket 40 by a bellcrank 45 pivotally mounted on the bracket 40 and pivotally connected with the upper portion of the sleeve 44; a link 46 is pivotally connected to the lower portion of the sleeve 44 and to the bracket 40. On the lower end of the lever 39 is mounted a roller 47 which engages with the upper hook shaped end of the bellcrank 45. By the construction last described, it is apparent that the rear of the plow is raised by the operation of raising the front thereof, but I do not limit myself to the type of mechanism shown and described for raising and lowering the rear of the plow.

When the plow is lowered the axles 13 and 19 are rocked simultaneously in the same direction, through their connection with each other by the link 22, and if the lever 33 is held in the position shown in Figure 4 the axles will be parallel, as they are when first opening a field. On the succeeding round, however, the wheel 23 will travel in the furrow previously made and in consequence the plow will be canted in a furrowward direction, and I then level it by rocking the lever 33 forwardly and actuating the bellcrank 27, to which the lever 33 is secured, so that the plow is raised to a level, the bellcrank 27 operating as a lever having its fulcrum on the axle 19, and assisted in the operation by the tension of the spring 32. When the plow is raised and the wheels are on level ground, I again level the plow by rocking the lever 33 in a rearward direction thereby actuating the bellcrank 27 to lower the furrowward side of the plow until both bearings of the axle 19 are in line.

What I claim is—

1. In a wheeled plow, the combination of a plow-carrying frame, a land wheel mounted on a crank axle held in fixed bearings on the frame, a furrow wheel mounted on a crank axle parallel with the land wheel axle, means connecting together the axles for transmitting rocking movements, means for rocking one of the crank axles and holding it in adjusted position for adjusting the frame vertically, and means for bodily adjusting vertically the wheel-carrying portion of the furrow axle independently of the land wheel axle.

2. In a wheeled plow, the combination of a plow-carrying frame, a crank axle rockably journaled in fixed bearings on the frame, a land wheel mounted on said crank axle, a second crank axle rockably mounted in bearings carried by the frame and having its outer end portion adapted to be vertically bodily adjusted, means connected with the first mentioned crank axle and with the frame for rocking said axle to adjust the frame vertically, and means for bodily moving vertically the outer end portion of the other crank axle.

3. In a wheeled plow, the combination of a plow carrying frame, a landwheel mounted on a crank axle rockably journaled in fixed bearings on the frame, a bellcrank pivoted on the furrowward portion of the frame, a furrow wheel mounted on a crank axle parallel with the landwheel crank axle and having its landward end rockably journaled in a fixed bearing on the frame and rockably supported furrowward by said bellcrank, means connecting said axles for simultaneous rocking movement, and means to actuate the bell crank whereby the furrow wheel axle is rocked in a vertical direction.

4. In a wheeled plow, the combination of a plow carrying frame, a landwheel mounted on a crank axle rockably journaled in fixed bearings on the frame, a bell crank pivoted on the furrowward portion of the frame and having one of its arms extending forwardly, a furrow wheel mounted on a crank axle parallel with the landwheel crank axle and having its landward end rockably journaled in a fixed bearing and an adjustable bearing on the frame and in parallelism with the landwheel axle and connected therewith for simultaneous rocking movement, and means to actuate the bell crank whereby the furrow wheel axle is rocked longitudinally to raise or lower the furrowward side of the plow.

5. In a wheeled plow, the combination of a plow carrying frame, transversely disposed crank axles mounted in bearings on said frame to rock about transverse axes, a wheel mounted on one of said axles at one side of said frame, a wheel mounted on the other of said axles at the opposite side of said frame, means connecting said axles together for effecting simultaneous rocking thereof, and means for adjusting one of said axles toward or from the frame independently of rocking of such axle about its transverse axis, to raise or lower one side of said frame relatively to the wheel at that side thereof.

6. In a wheeled plow, the combination of a plow carrying frame, a transversely disposed rocking crank axle mounted in bearings on said frame, a landwheel mounted on said crank axle, means for rocking said crank axle to vary the depth of plowing, a furrow wheel, a transversely disposed crank axle adapted to rock about a transverse axis and on which said furrow wheel is mounted, inner and outer bearings on the frame for said furrow wheel axle, said outer bearing being vertically adjustable to raise or lower the furrowward side of the frame relatively to the furrow wheel, means for so adjusting said outer bearing, and means connecting said axles together for effecting simultaneous rocking thereof.

7. In a wheeled plow, the combination of a plow carrying frame, a transversely disposed rocking crank axle mounted in bearings on said frame, a landwheel mounted on said crank axle, means for rocking said crank axle to vary the depth of plowing, a furrow wheel, a transversely disposed crank axle adapted to rock about a transverse axis, and on which said furrow wheel is mounted, means supporting said furrow wheel axle on the frame and adjustable to raise or lower the furrowward side of said frame relatively to the furrow wheel axle independently of rocking of said axle about its transverse axis, means for so adjusting said supporting means, and means connecting said axles together for effecting simultaneous rocking thereof.

WAYNE G. DUFFIELD.